No. 660,354. Patented Oct. 23, 1900.
A. ANDERSON.
DRYING KILN.
(Application filed Oct. 23, 1899.)
(No Model.) 2 Sheets—Sheet 2.
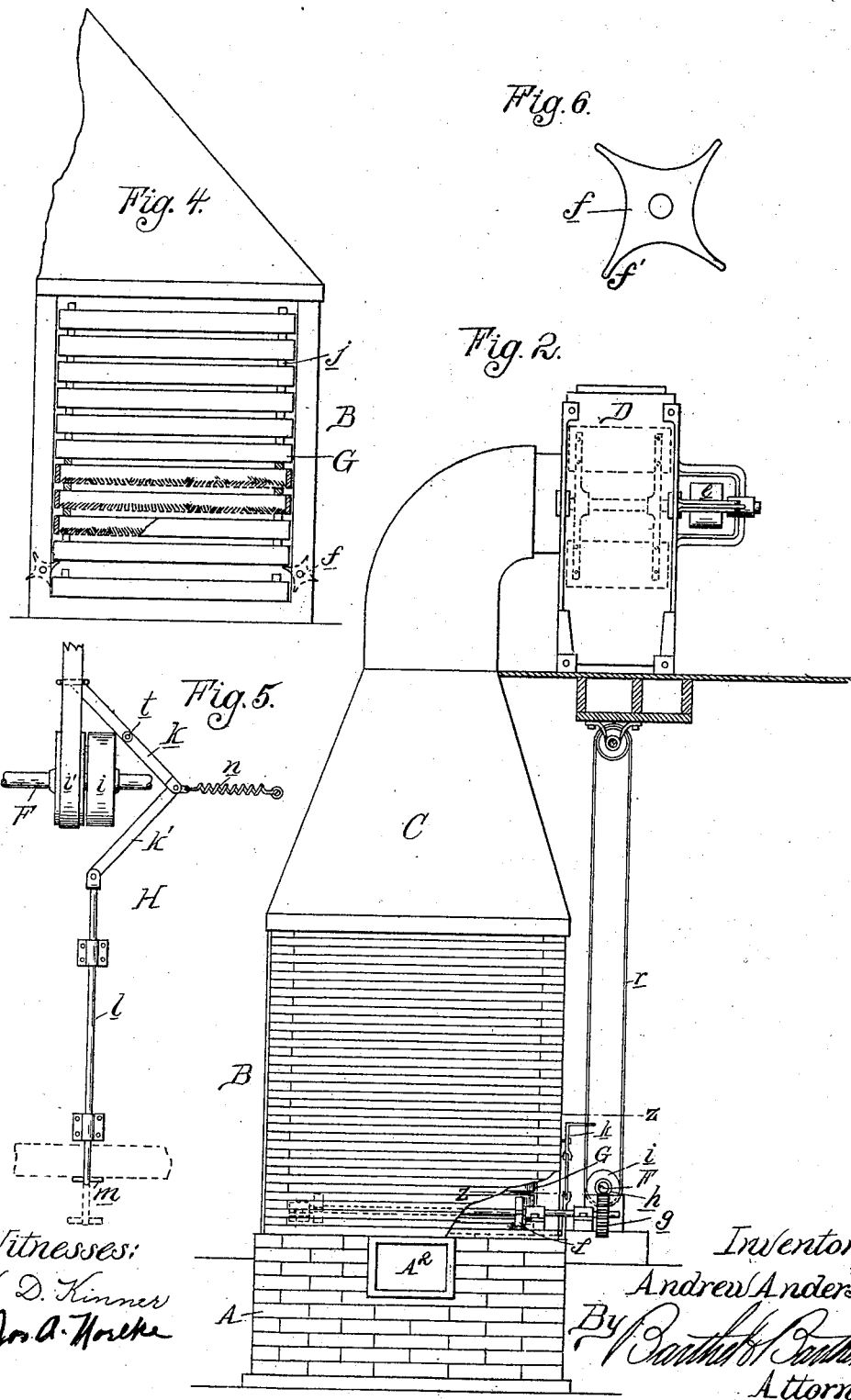
Witnesses:
V. D. Kinner
Jos. A. Hoeke
Inventor:
Andrew Anderson,
By Barthel & Barthel
Attorneys.

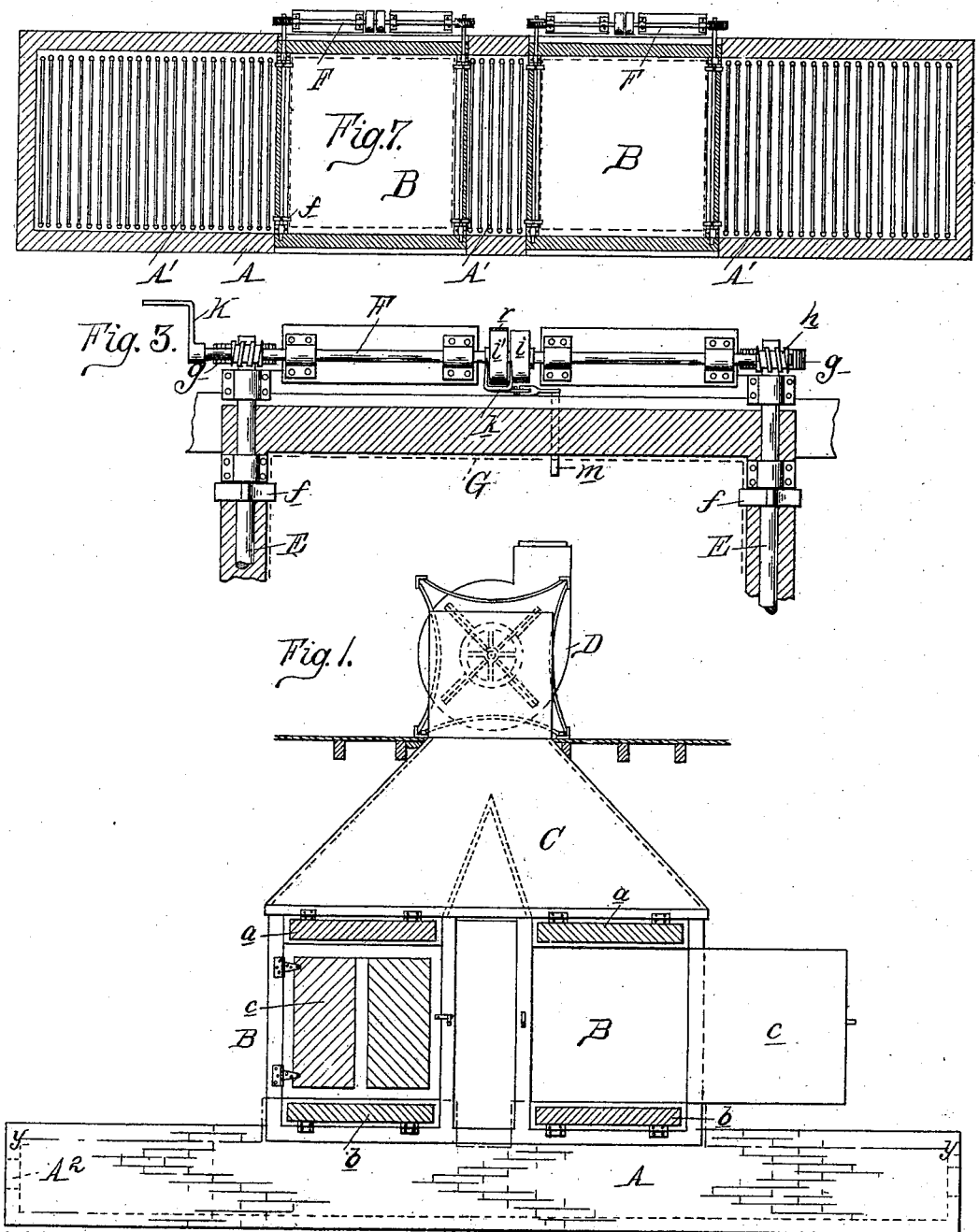

UNITED STATES PATENT OFFICE.

ANDREW ANDERSON, OF DETROIT, MICHIGAN.

DRYING-KILN.

SPECIFICATION forming part of Letters Patent No. 660,354, dated October 23, 1900.

Application filed October 23, 1899. Serial No. 734,484. (No model.)

*To all whom it may concern:*

Be it known that I, ANDREW ANDERSON, a citizen of the United States of America, residing at Detroit, in the county of Wayne and State of Michigan, have invented certain new and useful Improvements in Drying-Kilns, of which the following is a specification, reference being had therein to the accompanying drawings.

My invention relates to new and useful improvements in dry-kilns for match-splints, and has for its object to construct a kiln that will be continuous in its operation, so that the green match-splints may be fed in and the dried splints removed without interfering with the operation of the device; and to this end it consists of a drying-compartment adapted to receive a vertical series of superimposed trays containing the match-splints and means for releasing the bottom tray from under the pile, so that it may be withdrawn and room made on the top to feed in a new tray, all in the manner as more fully hereinafter described, and shown in the accompanying drawings, in which—

Figure 1 is a front elevation of my dry-kiln. Fig. 2 is a side elevation thereof. Fig. 3 is a section on line $z\ z$, Fig. 2. Fig. 4 is a front elevation of one of the kilns with doors removed, showing the trays partly in section. Fig. 5 shows the belt-shifting mechanism, and Fig. 6 is an elevation of one of the sprocket-wheels for supporting the trays. Fig. 7 is a section on line $y\ y$, Fig. 1.

I have shown my invention as applied to a double kiln, in which A is a substructure forming a horizontal air-duct inclosing the heating-coils, and B represents two drying-chambers built above the middle of the duct and communicating therewith at the bottom. Each drying-chamber is adapted to hold a vertical series of rectangular trays containing the match-splints and has an upper door $a$ for introducing a fresh tray on top and a lower door $b$ for removing the lowest trays, all in the manner more fully hereinafter described. Between the upper and lower doors a large door $c$ may be provided for general access to the interior.

On top the drying-chambers communicate into the pyramidal-shaped hood C, from which the air is drawn into a suitable suction-fan D, provided with a drive-pulley $e$.

In the air-duct A are placed coils of steam-pipes A', as shown in Fig. 7, steam being supplied from any suitable source of supply, and in each end of the air-duct are openings $A^2$, through which the air to be heated is admitted. It will thus be seen that the air to be heated passes the entire length of heating-coils and is then drawn up through the vertical series of trays, which are filled with the match-splints.

The means provided for carrying the trays through the drying-chambers are as follows:

E E are transverse shafts mounted near the base of the drying-chambers in suitable bearings in the side walls and each carrying two particularly-shaped sprocket-wheels $f$, the sprocket-teeth $f'$ of which are adapted to freely support the whole stack of trays in the drying-chambers. Each shaft E at its rear end carries a worm-gear $g$, which meshes with a worm $h$ on a longitudinal shaft F, mounted in rear of the drying-chambers. The shaft F carries the loose and tight pulleys $i\ i'$ and receives motion through a belt $r$ under the control of a belt-shifter, which comprises the lever $k$, pivotally secured at $t$ and having a forked end embracing the belt. The other end of the lever is connected by a link $k'$ to a rod $l$, secured in vertical bearings and having at its lower end an arm $m$, extending horizontally beneath the lowermost tray in the drying-chamber. A spring $n$ is attached to the lever $k$, which by its tension holds it in the position shown in Fig. 5, in which the belt is on the fast pulley $i'$.

G shows rectangular trays having perforated bottoms, preferably made of wire screen, and they are of a size to be freely guided by the vertical walls of the drying-chamber. The trays are superimposed upon each other, with open spaces between them, preferably formed by means of strips $j$, fastened across the top and serving as rails in sliding the trays in or out.

In practice the entire stack of trays, which are filled with match-splints, are supported within the drying-chamber by the four sprocket-wheels $f$, each one of which has one of its four sprocket-teeth projecting beneath the bottom tray, and on account of the worm-gears on the shafts E and F the sprocket-wheels are interlocked and support the trays in position; but if power is applied to the shaft F in a proper direction the shafts E are revolved and the whole stack of trays in the drying-chamber drops down slowly till the supporting sprocket-teeth move out entirely from beneath the lowermost tray and let it freely drop a little distance farther, while the next set of sprocket-teeth engage beneath the tray next above and uphold all the trays above. The lowermost tray in dropping presses down the arm $m$ of the rod $l$, which thereby shifts the belt $r$ onto the loose pulley $i$ and stops the further motion of the shaft F. The lowermost tray is thus released from the weight of the trays above and may be removed through the door in front and a fresh tray introduced on top through the upper door. As soon as the lower tray is removed the spring $m$ actuates the belt-shifter and draws the belt into the fast pulley, thus giving motion to the shaft F and repeating the operation, as before described.

While I have shown a separate shaft F with separate drive connection for each drying-chamber, the two shafts may be in one, with a single drive connection, or the drive connections may be entirely dispensed with, and the shaft or shafts F may then be merely turned by hand, whenever it is desired to remove a tray, by means of a crank K, applied to the end of the shaft F, as shown in Fig. 3. It will be seen that with my construction the device is simple and exceedingly compact. It requires only a comparatively small floor-space, as the heating-plenum is built underground and the large volume of heated air follows a vertical path up through the trays, where it has to pass through the interstices between the splints, which are irregularly piled in the trays, and as the green splints are fed in on top the moisture cannot come in contact with the dried matches. The device operates continuously faster or slower, as required to keep step with the work.

The trays may be ordinarily made of a size to be easily handled by two men and, if desired, may be placed on low truck-wheels, with suitable tracks built out in front of the doors $a$ and $b$ to wheel them into and out of the drying-chamber. As such an arrangement obviously suggests itself, it is not necessary to describe it any further.

What I claim as my invention is—

1. In a dry-kiln for match-splints, the combination of a drying-chamber, a series of independent trays superimposed upon each other within the walls of said chamber and forming open intervals between the sides, transverse shafts mounted in the side walls of the chamber near the base thereof, wheels upon said shafts having radial sprocket-teeth at substantially right angles to each other adapted to engage into the intervals between the trays to support the same in position and release the bottom tray and a drive-shaft having interlocking drive-gear with the transverse shafts.

2. In a dry-kiln, the combination of two drying-compartments B adjacent to each other, the hot-air heating-duct A communicating into the base of said compartments, a hood C at the top of said compartments, a suction-fan D communicating therewith, a hot-air heating-duct communicating with the base of the drying-compartments, a vertical series of superimposed trays G provided with perforated bottoms, the sprocket-wheels $f$ having the radial arms $f'$ adapted to movably support the trays within the drying-chamber, and the doors $a\ b$ in the drying-chamber for the insertion of fresh trays on top and the removal of the lowest tray at the bottom respectively.

3. In a dry-kiln, the combination with a drying-compartment, having suitable receiving and discharging doors at the top and bottom thereof, and a vertical series of superimposed trays contained therein, of the supporting-wheels mounted on shafts on opposite sides of the drying-compartment near the bottom thereof, said wheels having radial arms adapted to movably support all the trays above the bottom of the drying-chamber and to release the bottom tray.

4. In a dry-kiln, the combination with a drying-compartment and a series of superimposed trays contained therein, the sprocket-wheels $f$ mounted on the shafts E E and having the radial arms $f'$ adapted to engage into the intervals between the trays to support the same in position and to release the bottom tray.

In testimony whereof I affix signature in presence of two witnesses.

ANDREW ANDERSON.

Witnesses:
OTTO F. BARTHEL,
V. D. KINNER.